(12) United States Patent
Chrastil et al.

(45) Date of Patent: Apr. 18, 2023
(10) Patent No.: US 11,629,630 B2

(54) EXHAUST COOLANT SYSTEM AND METHOD

(71) Applicant: CUMMINS INC., Columbus, IN (US)

(72) Inventors: Brandon E. Chrastil, North Charleston, SC (US); Doyle E. Whittington, Charleston, SC (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 17/674,662

(22) Filed: Feb. 17, 2022

(65) Prior Publication Data

US 2022/0170408 A1 Jun. 2, 2022

Related U.S. Application Data

(63) Continuation of application No. 15/734,628, filed as application No. PCT/US2018/037127 on Jun. 12, 2018, now Pat. No. 11,293,330.

(51) Int. Cl.
  F01P 3/12 (2006.01)
  F01P 7/14 (2006.01)
  (Continued)

(52) U.S. Cl.
  CPC ............ F01P 3/12 (2013.01); F01N 3/046 (2013.01); F01P 3/02 (2013.01); F01P 7/14 (2013.01);
  (Continued)

(58) Field of Classification Search
  CPC .................................... F01P 3/02; F01P 7/14
  See application file for complete search history.

(56) References Cited

U.S. PATENT DOCUMENTS

| RE26,400 E | 6/1968 | Jasper |
| 4,069,672 A * | 1/1978 | Milling ............... F01K 25/065 |
| | | 60/649 |

(Continued)

FOREIGN PATENT DOCUMENTS

| EP | 2 392 794 | 12/2011 |
| KR | 20050020156 | 3/2005 |

OTHER PUBLICATIONS

European Search Report for EP Application No. 18922478.5, dated Jan. 27, 2022.

(Continued)

*Primary Examiner* — Long T Tran
(74) *Attorney, Agent, or Firm* — Foley & Lardner LLP

(57) ABSTRACT

A system includes an engine defining a water jacket fluidly coupled to a heat exchanger. An exhaust manifold defines an exhaust manifold cooling passage. A pump is fluidly coupled to the water jacket, and to each of the heat exchanger and the exhaust manifold cooling passage. An engine cooling circuit includes the water jacket, the heat exchanger, and the pump. An exhaust cooling circuit is selectively fluidly coupled to the engine cooling circuit. The exhaust cooling circuit includes the water jacket, the exhaust manifold cooling passage, and the pump. A control valve includes an inlet fluidly coupled to a first portion of the water jacket. A first outlet is fluidly coupled to a second portion of the water jacket. A second outlet is fluidly coupled to the exhaust cooling circuit. The control valve is structured to selectively control flow of coolant fluid through the second outlet.

22 Claims, 6 Drawing Sheets

(51) Int. Cl.
*F01N 3/04* (2006.01)
*F01P 3/02* (2006.01)
*F01P 11/02* (2006.01)
*F02B 39/00* (2006.01)

(52) U.S. Cl.
CPC ........ *F01P 11/0276* (2013.01); *F02B 39/005* (2013.01); *F01P 2003/021* (2013.01); *F01P 2007/146* (2013.01); *F05D 2220/40* (2013.01); *F05D 2260/232* (2013.01)

(56) References Cited

U.S. PATENT DOCUMENTS

| | | | |
|---|---|---|---|
| 4,348,991 | A | 9/1982 | Stang et al. |
| 4,977,741 | A | 12/1990 | Lulloff et al. |
| 5,110,418 | A | 5/1992 | Garrison et al. |
| 6,406,344 | B1 | 6/2002 | Bland et al. |
| 6,672,919 | B1 | 1/2004 | Beson |
| 6,800,004 | B1 | 10/2004 | White et al. |
| 7,287,493 | B2 | 10/2007 | Buck |
| 7,421,983 | B1 | 9/2008 | Taylor |
| 9,188,051 | B1 * | 11/2015 | Zahdeh ................... F01N 3/046 |
| 10,107,175 | B1 * | 10/2018 | Bowler ..................... F01P 3/20 |
| 2013/0125842 | A1 * | 5/2013 | Frick ..................... F22B 1/1807 122/7 R |
| 2013/0199178 | A1 * | 8/2013 | Kanou ................... F01K 23/065 60/605.2 |
| 2013/0206085 | A1 * | 8/2013 | Adam ...................... F02F 1/02 123/41.72 |
| 2013/0305708 | A1 * | 11/2013 | Zahdeh .................... F01P 3/20 60/599 |
| 2014/0013743 | A1 * | 1/2014 | Dane ........................ F01N 5/02 60/273 |
| 2014/0042234 | A1 * | 2/2014 | Moser ................... B60H 1/025 237/12.4 |
| 2014/0209046 | A1 * | 7/2014 | Steiner ..................... F01P 5/10 123/41.31 |
| 2016/0114260 | A1 * | 4/2016 | Frick ..................... B01D 3/007 203/12 |
| 2017/0074152 | A1 * | 3/2017 | Woo ......................... F02F 1/14 |
| 2018/0371982 | A1 * | 12/2018 | Bilancia ................. F02M 26/28 |
| 2019/0048783 | A1 * | 2/2019 | Yoshimi ................... F01P 7/16 |
| 2019/0153975 | A1 * | 5/2019 | Oh ............................ F01P 3/02 |
| 2020/0063636 | A1 * | 2/2020 | Quix ....................... F02F 1/16 |
| 2021/0156296 | A1 * | 5/2021 | Xi ..................... B60H 1/00899 |

OTHER PUBLICATIONS

International Search Report and Written Opinion on PCT/US2018/037127 dated Sep. 12, 2018, 10 pgs.
U.S. Notice of Allowance for U.S. Appl. No. 15/734,628 dated Nov. 17, 2021.

\* cited by examiner

EXHAUST COOLANT SYSTEM AND METHOD

CROSS-REFERENCE TO RELATED PATENT APPLICATIONS

The present application is a continuation of U.S. patent application Ser. No. 15/734,628, filed Dec. 3, 2020, which is a U.S. National Phase of PCT Patent Application No. PCT/US2018/037127, filed Jun. 12, 2018, the contents of which are incorporated herein by reference.

TECHNICAL FIELD

The present disclosure relates to the field of internal combustion engines. More specifically, the present disclosure relates to a system and method for cooling exhaust gas by modulating coolant fluid flow to minimize exhaust energy losses to the coolant.

BACKGROUND

Internal combustion engines typically include cooling systems that circulate coolant fluid through internal parts of the engine so that waste heat is transferred from the engine to the coolant fluid. The coolant fluid is transferred from the engine to a heat exchanger to transfer heat from the coolant fluid to the external environment.

Marine engines are types of engines that have been optimized for use with a boat or other type of watercraft device. Certain marine engines have stringent cooling requirements. For example, certain marine engine regulations specify maximum surface temperatures of the engine and exhaust systems in order to avoid injury to operators. For example, the International Convention for the Safety of Life at Sea (SOLAS) regulations stipulate that the surface temperature of components used on the high seas may not exceed 220 degrees Celsius. To this end, some marine engines have an exhaust cooling system in addition to an engine cooling system.

Certain marine engines are also subject to emissions standards. In general, regulated emissions for marine engines include carbon monoxide (CO), hydrocarbons, nitrogen oxides ($NO_x$) and particulates. Such regulations have become more stringent over recent years. For example, the regulated emissions of $NO_x$ and particulates from diesel-powered marine engines are low enough that, in many cases, the emissions levels cannot be met with improved combustion technologies alone. To that end, exhaust after-treatment systems are increasingly utilized to reduce the levels of harmful exhaust emissions present in exhaust gas.

Conventional exhaust gas after-treatment systems include any of several different components to reduce the levels of regulated pollutants present in exhaust gas. For example, certain exhaust aftertreatment systems for diesel-powered engines include various components, such as a diesel oxidation catalyst (DOC), a selective catalytic reduction (SCR) catalyst, a diesel particulate filter (DPF), an SCR on filter and/or an ammonia slip catalyst (ASC) (also referred to as an ammonia oxidation catalyst (AMOX)). Each of the DOC, SCR catalyst, DPF, SCR on filter and the ASC components are configured to perform a particular exhaust emissions treatment operation on the exhaust gas passing through or over the respective components.

SUMMARY

One embodiment relates to a system including an engine defining a water jacket. A heat exchanger is in coolant fluid receiving communication with the water jacket. The heat exchanger is structured to remove heat from the coolant fluid. An exhaust manifold is in exhaust gas receiving communication with the engine. The exhaust manifold defines an exhaust manifold cooling passage. A pump is in coolant fluid providing communication with the water jacket, and in coolant fluid receiving communication with each of the heat exchanger and the exhaust manifold cooling passage. An engine cooling circuit includes the water jacket, the heat exchanger, and the pump. An exhaust cooling circuit is in coolant fluid receiving communication with the engine cooling circuit. The exhaust cooling circuit includes the water jacket, the exhaust manifold cooling passage, and the pump. A control valve includes an inlet, a first outlet, and a second outlet. The inlet is in coolant fluid receiving communication with a first portion of the water jacket. The first outlet is in coolant fluid providing communication with a second portion of the water jacket. The second outlet is in coolant fluid providing communication with the exhaust cooling circuit. The control valve is structured to selectively control flow of coolant fluid through the second outlet.

Another embodiment relates to a method. An engine cooling system is provided. The engine cooling system includes a pump structured to circulate a coolant fluid through an engine cooling circuit including a water jacket of an engine, and a heat exchanger. An exhaust cooling system is provided. The exhaust cooling system includes a control valve, and an exhaust cooling circuit selectively fluidly coupled to the engine cooling circuit via the control valve. The exhaust cooling circuit includes an exhaust manifold cooling passage defined by an exhaust manifold. A first temperature measurement value relating to a first surface temperature of the exhaust manifold is received from a first temperature sensor operatively coupled to the exhaust manifold. The first surface temperature is determined by interpreting the first temperature measurement value. A control signal is transmitted to the control valve in response to the first surface temperature exceeding a predetermined value. The control signal causes the control valve to be actuated to a first position so as to permit coolant fluid to flow through the exhaust cooling circuit.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

Figure 1:
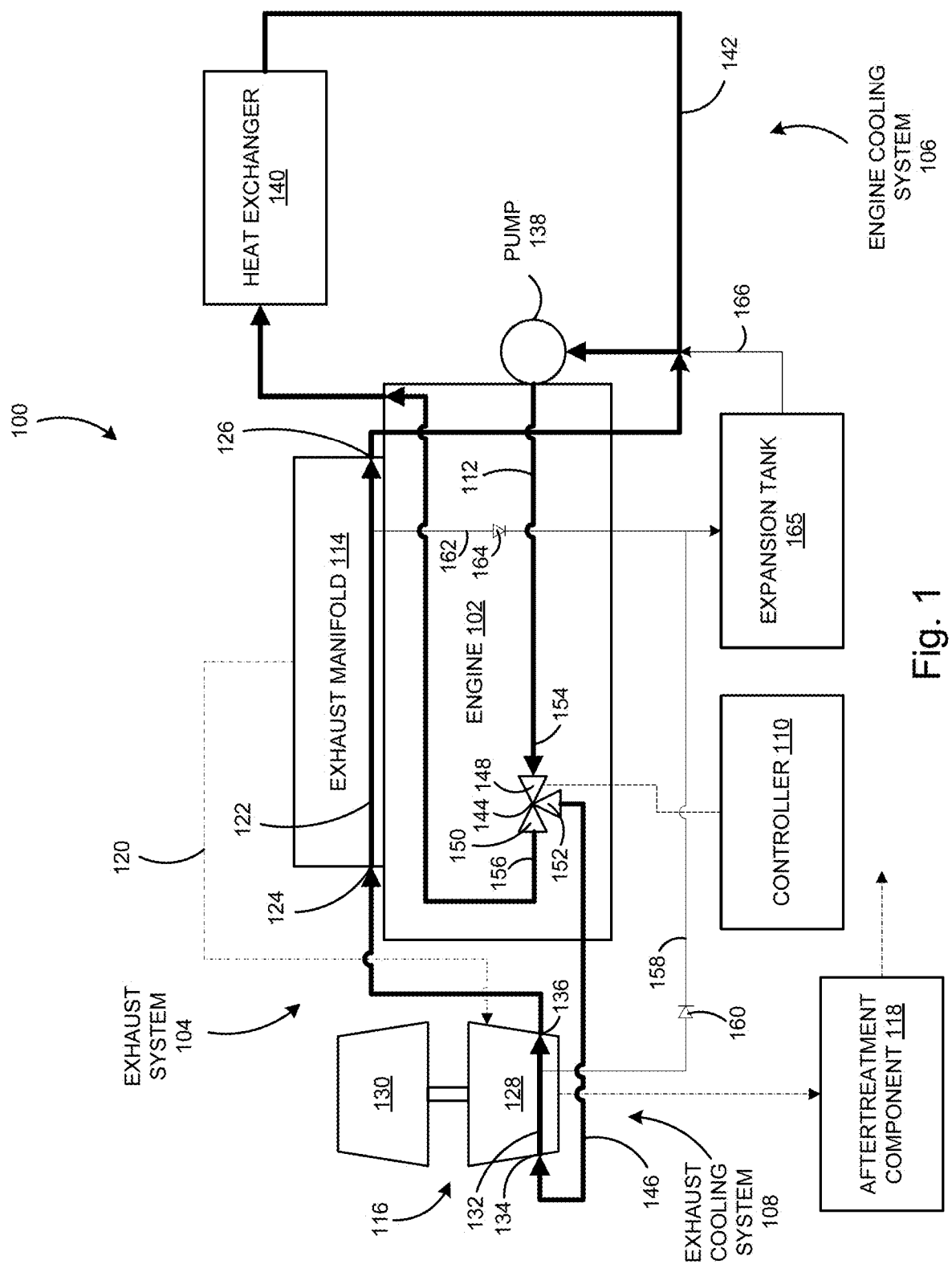
FIG. 1 is a schematic block diagram of an engine system, according to an example embodiment.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Some marine engines utilize water-cooled engine and exhaust cooling systems in which water (e.g., raw sea water) is pumped through the engine and through the exhaust manifold to cool the engine and the exhaust manifold. In some systems, the water is subsequently injected into the exhaust gas stream to further cool the exhaust gas. Without sufficient exhaust cooling, surface temperatures of engine and exhaust components may exceed maximum rated values, which may create a fire hazard and degrade the performance of the engine.

In various conventional marine exhaust cooling systems, the coolant pump (e.g., water pump) is driven off of the crankshaft of the engine. Therefore, pump speed is correlated to engine speed. Exhaust gas cooling is most critical at high engine speeds and/or engine loads. Accordingly, exhaust gas cooling systems are designed to provide adequate cooling at worst-case operating conditions. Additionally, exhaust gas cooling is dictated at least in part by engine cooling requirements. For example, coolant (e.g., water) flow rate is the same through the engine and through the exhaust system.

One challenge with marine exhaust cooling systems is to prevent the systems from excessively cooling the exhaust gas. For example, because pump speed is correlated to engine speed, coolant is pumped through the exhaust cooling systems at all engine speeds, including low speeds. At such speeds, the surface temperature of the engine and exhaust manifold may not exceed rated limits. However, the exhaust cooling system nevertheless cools the exhaust system. As will be appreciated, this results in inefficient operation of the engine system. For example, transferring excessive exhaust energy to the engine's cooling system can result in reduced fuel efficiency.

Over-cooling the exhaust system also poses challenges regarding exhaust aftertreatment systems. Certain exhaust aftertreatment components require the exhaust gas flowing therethrough to be at or above a particular temperature for proper operation. If the exhaust gas is over-cooled prior to reaching an aftertreatment component, the exhaust gas must be heated in order for the aftertreatment component to operate properly. Exhaust gas temperature can be raised by controlling fuel injection parameters in the engine or by use of an exhaust heater or hydrocarbon doser. However, each method is inefficient because it requires introducing additional energy into the system to account for the energy that was unnecessarily removed from the exhaust gas.

Another challenge with marine exhaust cooling systems is that "wet" marine exhaust systems can preclude the use of exhaust aftertreatment components and can cause accelerated wear of exhaust components due to corrosion. For example, raw water (e.g., sea water) can impede reactions that must take place in aftertreatment components, such as oxidation catalysts or SCR catalysts. Additionally, raw water is more likely than coolant fluid to cause corrosion in exhaust components.

Various embodiments relate to an exhaust cooling system structured to actively control coolant fluid flow therethrough so as to minimize exhaust energy loss to the coolant fluid. An example embodiment includes an exhaust cooling circuit in coolant fluid receiving communication with an engine cooling circuit via a control valve. The exhaust cooling circuit comprises a turbine cooling passage defined by a turbocharger, and an exhaust manifold cooling passage defined by an exhaust manifold. The control valve is controllable between a first position, in which the coolant fluid is permitted to flow through the exhaust cooling circuit, and a second position, in which the coolant fluid is prevented from flowing through the exhaust cooling circuit.

A controller is operatively coupled to the control valve and to various other sensors. The controller is structured to minimize the flow rate of the coolant fluid through the exhaust cooling circuit while ensuring that defined limits are not exceeded. For example, in some embodiments, the controller is structured to actuate the control valve based on limits defined by one or more of (1) surface temperatures of the turbocharger and/or the exhaust manifold; (2) thermo-mechanical fatigue requirements of the turbocharger and/or the exhaust manifold; and (3) coolant fluid boiling point.

It is important to note that the exhaust cooling system, according to various embodiments, is structured to selectively use the coolant fluid that is also used by the engine cooling systems. Accordingly, the instant exhaust cooling system does not exhibit the challenges of existing systems that utilize raw water (e.g., sea water) to provide cooling to an exhaust system, such as preclusion of aftertreatment component usage and excessive corrosion. Therefore, the instant exhaust cooling system architecture enables several technical advantages by using coolant fluid rather than raw water.

In some embodiments, the exhaust cooling system further includes a drain system structured to drain coolant fluid from the exhaust cooling circuit, including from the exhaust manifold cooling passage and from the turbine cooling passage when the control valve is in the second position, in which coolant fluid is blocked from entering the exhaust cooling system. In operation, the outlet of the exhaust manifold cooling passage also operates as a drain to return the coolant from the exhaust cooling circuit to the engine cooling circuit.

Selectively draining coolant fluid from the exhaust cooling circuit solves various technical problems associated with eliminating coolant fluid flow through a cooling circuit. For example, coolant remaining in the exhaust manifold cooling passage or the turbine cooling passage may boil, which may damage the exhaust manifold and/or the turbocharger. The exhaust cooling system is also designed so as to insulate the exhaust manifold and/or the turbocharger. More specifically, removing the coolant fluid from the exhaust manifold or turbine cooling passages provides an insulating air gap between the hot exhaust gases flowing through the exhaust manifold and/or turbocharger so as to reduce their external surface temperatures.

FIG. 1 is a schematic block diagram of an engine system 100, according to an example embodiment. The engine system 100 of FIG. 1 includes an engine 102, an exhaust system 104, an engine cooling system 106, an exhaust cooling system 108, and a controller 110. In some embodiments, the engine 102 operates as a prime mover for an electric power generator or for a marine vehicle. The engine 102 may be powered by any of various types of fuels (e.g., diesel, natural gas, gasoline, etc.). As explained in further detail below, the engine 102 defines at least one water jacket 112.

The exhaust system 104 includes an exhaust manifold 114, a turbocharger 116, and exhaust aftertreatment component 118. The exhaust manifold 114 is operatively coupled to, and in exhaust gas receiving communication with, the engine 102. The exhaust manifold 114 is structured to receive hot exhaust gas from exhaust ports of the engine 102, and to transmit the hot exhaust gas to an exhaust pipe 120, to which other components may be operatively coupled. The exhaust manifold 114 defines an exhaust manifold cooling passage 122 extending through the exhaust manifold 114 from an inlet 124 to an outlet 126.

The turbocharger 116 includes a turbine 128 and a compressor 130. The turbine 128 is in exhaust gas receiving communication with the exhaust manifold 114 via the exhaust pipe 120. The turbine 128 converts some of the enthalpy contained in the exhaust gas into mechanical energy to drive the compressor 130. The compressor 130 draws in fresh intake air, compresses it, and provides the compressed intake air to an intake manifold (not shown) of the engine 102. In some instances, the compressed intake air is first provided to a charge air cooler and then to the intake manifold of the engine 102. The turbine 128 defines a turbine cooling passage 132 extending through the turbine 128 from a second inlet 134 to a second outlet 136.

The engine cooling system 106 is structured to provide cooling for the engine 102. According to various embodiments, the engine cooling system 106 includes a pump 138 (e.g., a water pump), the water jacket 112 of the engine 102, a heat exchanger 140, and an engine cooling circuit 142. The engine cooling circuit 142 defines a flow path for coolant fluid through the engine 102 and other components of the engine cooling system 106. It should be understood that the engine cooling circuit 142 includes conduits (not shown) fluidly coupling the engine 102 and other components of the engine cooling system 106. In some embodiments, the engine coolant fluid includes water. For example, the engine coolant fluid may include pure water or a mixture of water and antifreeze.

The pump 138 is positioned along the engine cooling circuit 142 upstream of the engine 102. It should be understood that the terms "upstream" and "downstream," when referring to the engine cooling system 106, refer to the flow direction of the coolant fluid through the engine cooling system 106. The pump 138 is structured to circulate the coolant fluid through the engine cooling circuit 142.

The water jacket 112 is positioned along the engine cooling circuit 142 downstream of, and in coolant fluid receiving communication with, the pump 138. It should be noted that the water jacket 112 is shown in schematic form only. The water jacket 112 includes an intricate series of passages extending through various parts of the engine 102, including a cylinder block, cylinders, and cylinder head, among other components. The water jacket 112 is structured to receive coolant fluid to which heat is transferred from the engine 102.

The heat exchanger 140 is positioned along the engine cooling circuit 142 downstream of, and in coolant fluid receiving communication with, the water jacket 112. The heat exchanger 140 is structured to transfer heat from the coolant fluid to another fluid medium. In some embodiments, the heat exchanger 140 is a keel cooler that is structured to transfer heat from the coolant fluid to raw water. In other embodiments, the heat exchanger 140 is an air-cooled radiator that is structured to transfer heat from the coolant fluid to air flowing therethrough. The heat exchanger 140 is also positioned along the engine cooling circuit 142 upstream of, and in coolant fluid providing communication with, the pump 138. Accordingly, the coolant fluid is transmitted from the heat exchanger 140 to the pump 138, where it is subsequently re-circulated through the engine cooling circuit 142.

The exhaust cooling system 108 is structured to provide cooling for the exhaust system 104. According to various embodiments, the exhaust cooling system 108 includes the water jacket 112, a control valve 144, the turbine cooling passage 132, the exhaust manifold cooling passage 122, the pump 138, and an exhaust cooling circuit 146. The exhaust cooling circuit 146 defines a flow path for coolant fluid through the engine 102 and other components of the exhaust cooling system 108. It should be understood that the exhaust cooling circuit 146 includes conduits (not shown) fluidly coupling the engine 102 and other components of the exhaust cooling system 108. In the embodiment illustrated in FIG. 1, the flow path defined by the exhaust cooling circuit 146 is such that coolant fluid flows first through the turbine cooling passage 132 and then through the exhaust manifold cooling passage 122. In other words, the turbine cooling passage 132 is upstream of the exhaust manifold cooling passage 122. However, in other embodiments, the flow path defined by the exhaust cooling circuit 146 is such that coolant fluid flows first through the exhaust manifold cooling passage 122 and then through the turbine cooling passage 132. In other words, the turbine cooling passage 132 is downstream of the exhaust manifold cooling passage 122.

The control valve 144 is structured to selectively fluidly couple the engine cooling circuit 142 and the exhaust cooling circuit 146. The control valve 144 includes an inlet 148, a first outlet 150, and a second outlet 152. The control valve 144 is structured to selectively control flow of coolant fluid through the second outlet 152. The inlet 148 is in coolant fluid receiving communication with a first portion 154 of the water jacket 112. The first outlet 150 is in coolant fluid providing communication with a second portion 156 of the water jacket 112. The second outlet 152 is in coolant fluid providing communication with the turbine cooling passage 132 and with the exhaust manifold cooling passage 122. It should be noted that, in some embodiments, the exhaust system 104 includes one of the exhaust manifold 114 and the turbocharger 116. Accordingly, in some embodiments, the second outlet 152 is in coolant fluid providing communication with one of the turbine cooling passage 132 and the exhaust manifold cooling passage 122. In one embodiment, the control valve 144 is an electronic coolant thermostat.

The controller 110 operatively and communicatively coupled to the control valve 144. The controller 110 is structured to controllably actuate the control valve 144 between a first position, a second position, and intermediate positions therebetween. When in the first position, the control valve 144 permits the coolant fluid to flow through the second outlet 152 and into the exhaust cooling system 108. When in the second position, the control valve 144 prevents the coolant fluid from flowing through the second outlet 152 and into the exhaust cooling system 108.

In some embodiments, the exhaust cooling system 108 also includes a drain system including one or more drain lines. The drain system is structured to drain coolant fluid from the exhaust cooling circuit 146, including from the exhaust manifold cooling passage 122 and from the turbine cooling passage 132 when the control valve 144 is in the second position, in which coolant fluid is blocked from entering the exhaust cooling system 108. As shown in FIG. 1, the drain system includes a first drain line 158 including a first check valve 160, and a second drain line 162 including a second check valve 164, an expansion tank 165, and a return line 166. The first drain line 158 is in coolant fluid receiving communication with the turbine cooling passage 132, and in coolant fluid providing communication with the expansion tank 165. The second drain line 162 is in coolant fluid receiving communication with the exhaust manifold cooling passage 122, and in coolant fluid providing communication with the expansion tank 165. The first check valve 160 prevents backflow of coolant fluid to the turbine cooling passage 132, and the second check valve 164 prevents backflow of coolant fluid to the exhaust manifold cooling passage 122. In operation, the outlet 126 of the exhaust manifold cooling passage 122 also operates as a drain to return the coolant from the exhaust cooling circuit 146 to the engine cooling circuit 142. The expansion tank 165 is in coolant fluid providing communication with the engine cooling circuit 142 via the return line 167. For example, in one embodiment, the return line 167 fluidly couples the expansion tank 165 and the engine cooling circuit 142 upstream of the pump 138.

Although not explicitly shown in FIG. 1, one of ordinary skill in the art will appreciate that the engine system includes various sensors in operative communication with the controller 110. For example, the engine system 100 includes various temperature sensors, pressure sensors, flow sensors, engine torque and load sensors, speed sensors, etc. Some temperature sensors are structured to measure a surface temperature of a component, such as the exhaust manifold 114. Other temperature sensors are structured to measure a temperature of exhaust gas or coolant fluid flowing through a passage. It should be appreciated that the engine system 100 includes many more sensors than those mentioned herein.

Figure 2:
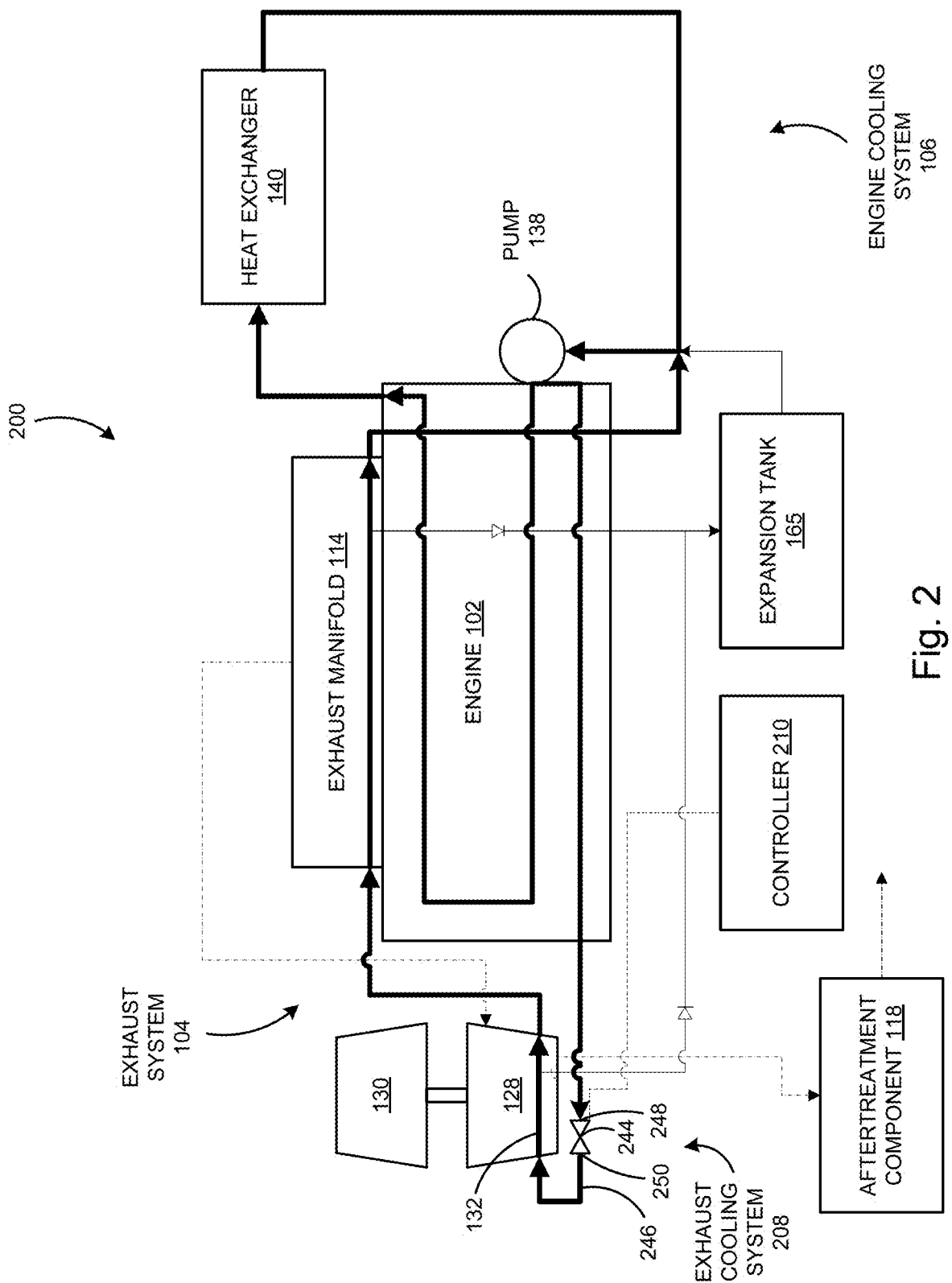
FIG. 2 is a schematic block diagram of an engine system, according to an alternative example embodiment.

FIG. 2 is a schematic block diagram of an engine system 200, according to an alternative example embodiment. It should be understood that the engine system 200 of FIG. 2 shares various components with the engine system 100 of FIG. 1. The engine system 200 of FIG. 2 differs from the engine system 100 of FIG. 1 in that the engine system 200 includes a two-way control valve 244 in contrast to the three-way control valve 144 of the system 100 of FIG. 1. The control valve 244 includes an inlet 248 and an outlet 250. The control valve 244 is structured to selectively control flow of coolant fluid through the outlet 250. In other words, the control valve 244 is structured to selectively control coolant fluid flow through an exhaust cooling circuit 246. The inlet 248 is in coolant fluid receiving communication with the pump 138. The outlet 250 is in coolant fluid providing communication with the turbine cooling passage 132.

A controller 210, in a similar manner as the controller 110 of FIG. 1, is operatively and communicatively coupled to the control valve 244. The controller 210 is structured to controllably actuate the control valve 244 between a first position, a second position, and intermediate positions therebetween. When in the first position, the control valve 244 permits the coolant fluid to flow through the outlet 250 and into the turbine cooling passage 132. Therefore, when in the first position, the control valve 244 permits the coolant fluid to flow through the exhaust cooling circuit 246. When in the second position, the control valve 244 prevents the coolant fluid from flowing through the outlet 250 and into the turbine cooling passage 132. Therefore, when in the second position, the control valve 244 blocks coolant fluid flow through the exhaust cooling circuit 246.

In an alternative embodiment, the engine system 200 includes two two-way control valves. A first two-way control valve is positioned upstream of the turbine cooling passage 132. A second two-way control valve is positioned upstream of the exhaust manifold cooling passage 122. Accordingly, in such embodiments, the turbine cooling passage 132 and the exhaust manifold cooling passage 122 are arranged in parallel rather than in series. Accordingly, in such embodiments, the first and second two-way control valves are independently controllable so as to independently control the amount of cooling provided to each of the turbine 128 and the exhaust manifold 114.

Figure 3:
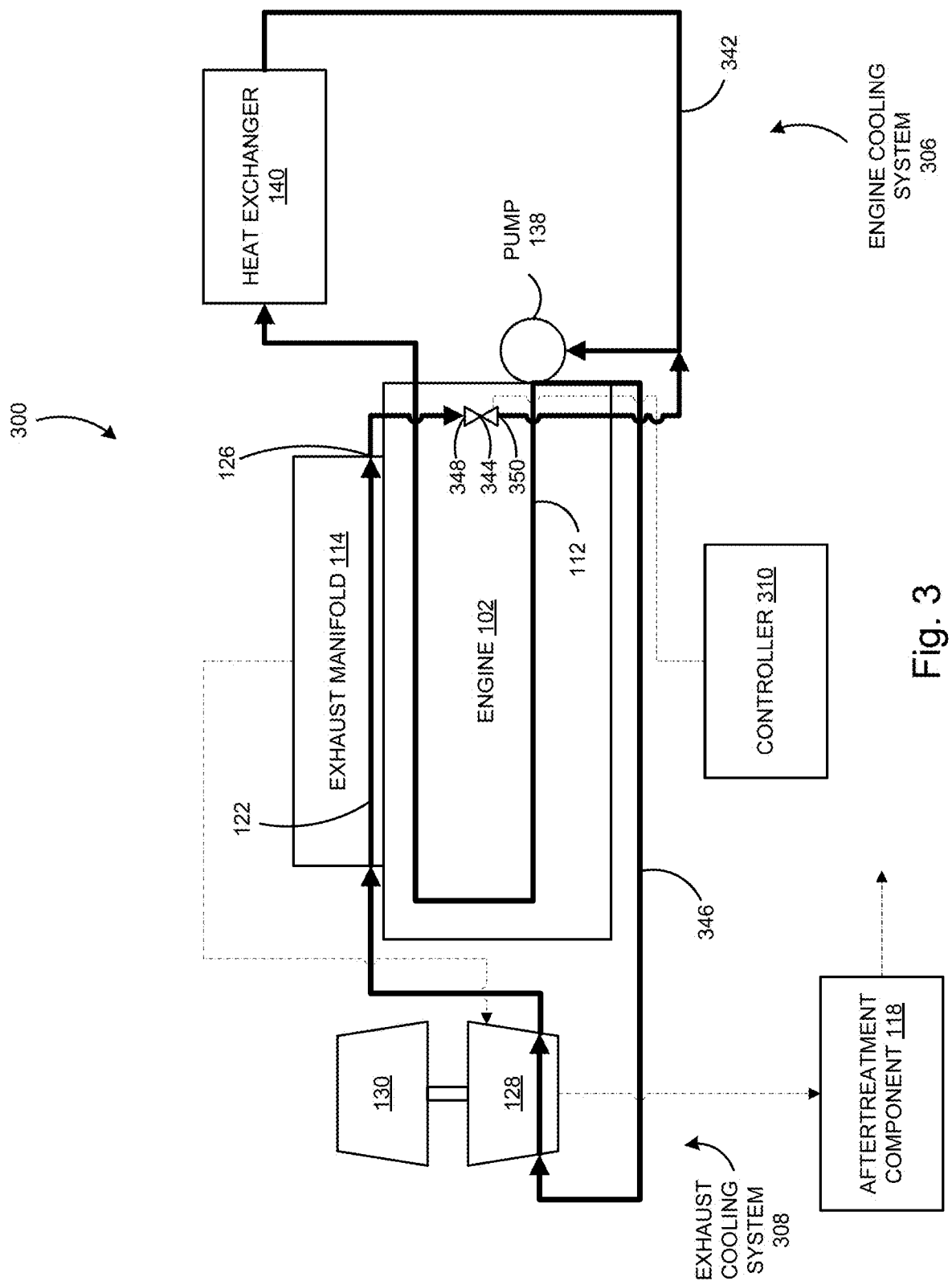
FIG. 3 is a schematic block diagram of an engine system, according to another alternative example embodiment.

FIG. 3 is a schematic block diagram of an engine system 300, according to another alternative example embodiment. It should be understood that the engine system 300 of FIG. 3 shares various components with the engine systems 100, 200 of FIGS. 1 and 2. The engine system 300 of FIG. 3 differs from the engine system 100 of FIG. 1 in that the engine system 300 does not include a drain system. The engine system 300 includes a control valve 344 structured to selectively fluidly couple an engine cooling circuit 342 and an exhaust cooling circuit 346. The control valve 344 includes an inlet 348 and an outlet 350. The control valve 344 is structured to selectively control flow of coolant fluid through the outlet 350. The inlet 348 is in coolant fluid receiving communication with the outlet 126 of the exhaust manifold cooling passage 122. The outlet 350 is in coolant fluid providing communication with the engine cooling circuit 342.

A controller 310, in a similar manner as the controllers 110, 210 of FIGS. 1 and 2, is operatively and communicatively coupled to the control valve 344. The controller 310 is structured to controllably actuate the control valve 344 between a first position, a second position, and intermediate positions therebetween. When in the first position, the control valve 344 permits the coolant fluid to flow through the outlet 350 and into the engine cooling circuit 342. When in the second position, the control valve 344 prevents the coolant fluid from flowing through the outlet 350 and into the engine cooling circuit 342.

Figure 4:
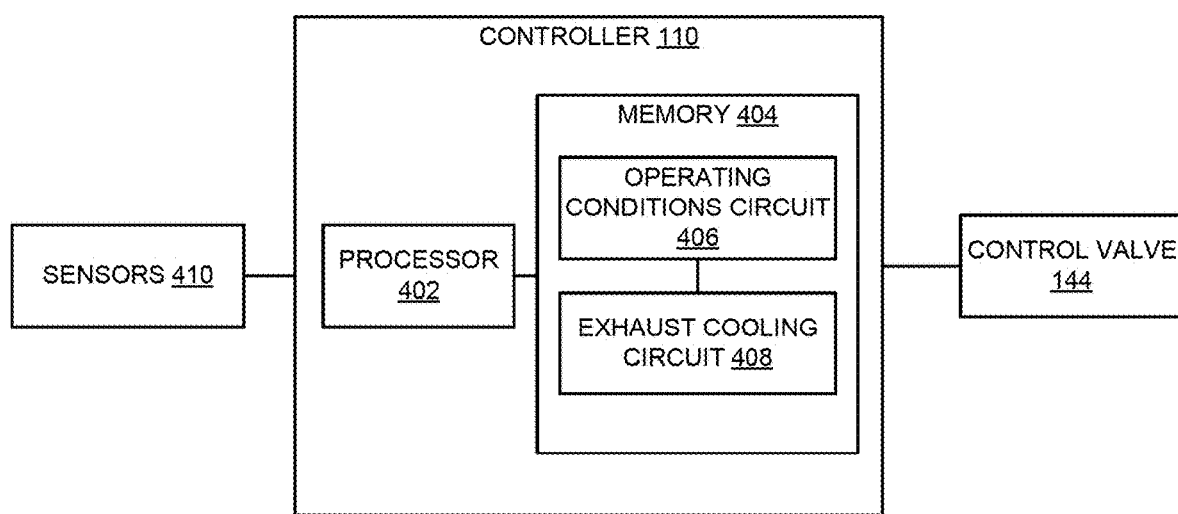
FIG. 4 is a block diagram of the controller of FIG. 1.

FIG. 4 is a block diagram of the controller 110 of FIG. 1. The controller 110 includes a processor 402 and memory 404. It should be understood that the controllers 210 and 310 may be structured in a generally similar manner to the controller 110. The memory 404 is shown to include an operating conditions circuit 406 and an exhaust cooling circuit 408, each communicably coupled to the others. In general, the operating conditions circuit 406 and the exhaust cooling circuit 408 are structured to control operation of the control valve 144 based on monitored operating conditions of the engine system 100. While various circuits with particular functionality are shown in FIG. 4, it should be understood that the controller 110 may include any number of circuits for completing the functions described herein. For example, the activities of multiple circuits may be combined as a single circuit, additional circuits with additional functionality may be included, etc. Further, it should be understood that the controller 110 may further control other vehicle activity beyond the scope of the present disclosure. For example, in some embodiments, the controller 110 is implemented via an electronic engine control module, transmission control module, etc.

Certain operations of the controller 110 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or pulse width modulation (PWM) signal) indicative of the value, receiving a computer generated parameter indicative of the value, reading the value from a memory location on a non-transient computer readable storage medium, receiving the value as a run-time parameter by any means known in the art, receiving a value by which the interpreted parameter can be calculated, and/or by referencing a default value that is interpreted to be the parameter value.

The operating conditions circuit 406 is in operative communication with various sensors 410. The operating conditions circuit 406 is structured to receive measurement values from the sensors 410 and to interpret measurement values based on the received measurement values. The sensors 410 may include any of various types of sensors configured to measure characteristics related to the engine 102, the exhaust system 104, the engine cooling system 106, the exhaust cooling system 108, and/or related systems. The sensors 412 may also include other temperature sensors (e.g., on the engine block, in any of the coolant passages, in the exhaust passage, or in any other location), an engine speed sensor, an engine torque sensor, a vehicle speed sensor, a position sensor, etc. Accordingly, the measurement values may include, but are not limited to, an engine temperature, a coolant temperature, an exhaust temperature, an engine speed, an engine load, a vehicle speed, a valve position, and/or any other engine or system characteristics.

The exhaust cooling circuit 408 is in operative communication with the operating conditions circuit 406, and with the control valve 144 of the exhaust cooling system 108 of FIG. 1. The exhaust cooling circuit 408 is structured to determine an exhaust cooling demand based on various factors (e.g., one or more of coolant temperature, component surface temperature, engine load, engine speed, vehicle speed, etc.) and to control operation of the control valve 144 so as to actively control coolant fluid flow through the exhaust cooling circuit 408.

Figure 5:
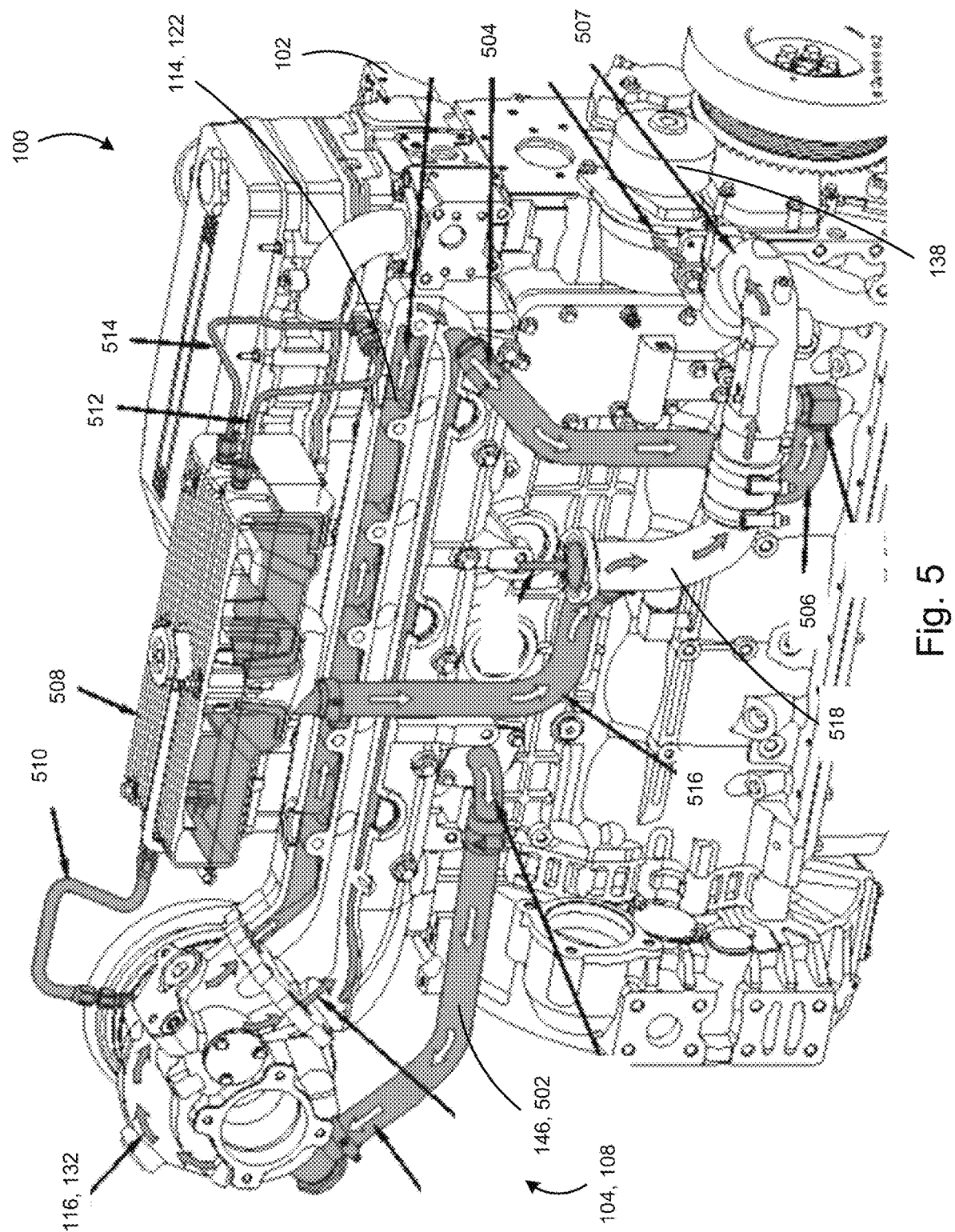
FIG. 5 is a partial cross-sectional perspective view of the engine system of FIG. 1.

FIG. 5 is a partial cross-sectional perspective view of the engine system 100 of FIG. 1. FIG. 5 illustrates various aspects of the exhaust cooling system 108 as implemented on the engine 102. As shown in FIG. 5, the exhaust system 104 includes the exhaust manifold 114 and the turbocharger 116.

FIG. 5 illustrates portions of the exhaust cooling system 108, including the turbine cooling passage 132, the exhaust manifold cooling passage 122, the pump 138, and the exhaust cooling circuit 146. The exhaust cooling system 108 also includes a first exhaust cooling passage 502 fluidly coupling the engine cooling circuit inside of the engine 102 and the turbine cooling passage 132. The exhaust cooling system 108 also includes a second exhaust cooling passage 504 fluidly coupling the exhaust manifold cooling passage 122 and a coolant return 506, which is fluidly coupled to a coolant inlet 507. Coolant fluid flows through the exhaust manifold cooling passage 122 as follows. The coolant fluid flows into the first exhaust cooling passage 502 from the engine 102. The coolant fluid flows through the turbine cooling passage 132 and into the exhaust manifold cooling passage 122. The coolant fluid flows from the exhaust manifold cooling passage 122, through the second exhaust cooling passage 504, and to the coolant return 506.

As illustrated in FIG. 5, the exhaust cooling system 108 also includes an expansion tank 508, a turbocharger vent line 510, an exhaust manifold vent line 512, and a cylinder head vent line 514. The turbocharger vent line 510 fluidly couples the turbine cooling passage 132 and the expansion tank 508 so as to allow coolant fluid vapor to vent from the turbine cooling passage 132 to the expansion tank 508. The exhaust manifold vent line 512 fluidly couples the exhaust manifold cooling passage 122 and the expansion tank 508 so as to allow coolant fluid vapor to vent from the exhaust manifold cooling passage 122 to the expansion tank 508. The cylinder head vent line 514 fluidly couples a cylinder head of the engine 102 and the expansion tank 508 so as to allow coolant fluid vapor to vent from the cylinder head to the expansion tank 508. The expansion tank 508 is fluidly coupled to the coolant return 506 via a coolant make-up line 516. The expansion tank 508, the turbocharger vent line 510, the exhaust manifold vent line 512, and the cylinder head vent line 514 account for coolant fluid expansion at higher temperatures without over-pressuring the exhaust cooling system 108.

FIG. 5 also illustrates a first engine cooling passage 318 fluidly coupling the heat exchanger 140 (not shown in FIG. 5) and the coolant inlet 507.

Figure 6:
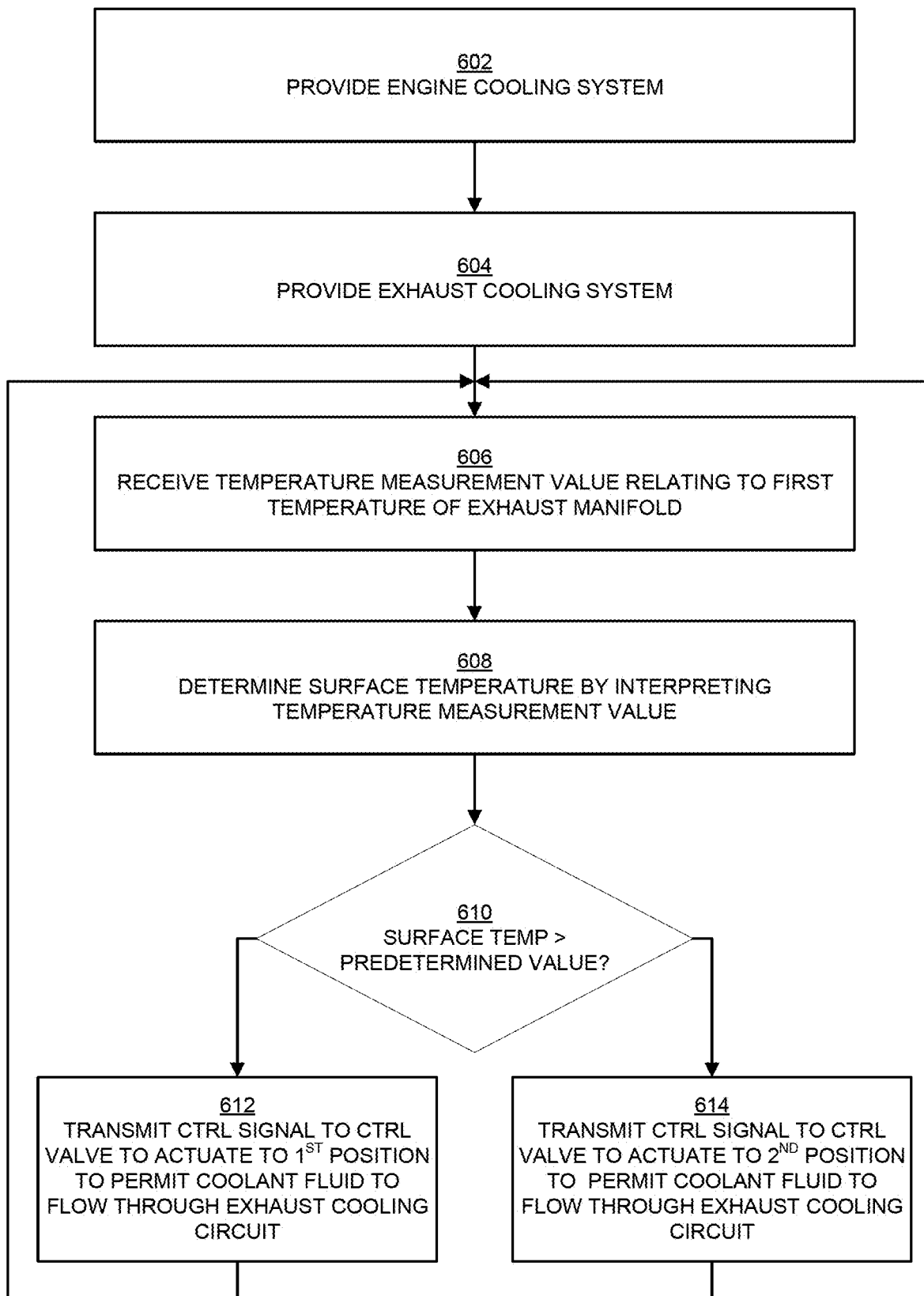
FIG. 6 is a flow diagram of a method of controlling coolant fluid flow through an exhaust cooling system so as to minimize exhaust energy losses to the coolant, according to an embodiment.

FIG. 6 is a flow diagram of a method 600 of controlling coolant fluid flow through an exhaust cooling system so as to minimize exhaust energy losses to the coolant, according to an embodiment. The method 600 may be performed by the engine system 100 of FIGS. 1 and 5. However, it should be understood that the method may be performed in a similar manner by other systems and devices.

At 602, an engine cooling system is provided. The engine cooling system includes a pump structured to circulate a coolant fluid through an engine cooling circuit including a water jacket of an engine, and a heat exchanger.

At 604, an exhaust cooling system is provided. The exhaust cooling system includes a control valve, and an exhaust cooling circuit selectively fluidly coupled to the engine cooling circuit via the control valve. The exhaust cooling circuit includes an exhaust manifold cooling passage defined by an exhaust manifold. In some embodiments, the exhaust cooling circuit further includes a turbine cooling passage defined by a turbine of a turbocharger.

At 606, a first temperature measurement value relating to a first surface temperature of the exhaust manifold is received from a first temperature sensor operatively coupled to the exhaust manifold. In some embodiments, a second temperature measurement second relating to a second surface temperature of the turbine housing is also received from a first temperature sensor operatively coupled to the turbine housing. Other embodiments include receiving additional temperature measurement values or other measured values.

At 608 The first surface temperature is determined by interpreting the first temperature measurement value. In embodiments in which additional measurement values are received, the measured parameters are determined by interpreting the received temperature measurement values.

At 610, it is determined whether the first surface temperature exceeds a first predetermined value. The first predetermined value may be a maximum permitted surface temperature of the exhaust manifold. The first predetermined value may also relate to thermo-mechanical fatigue requirements of the exhaust manifold. In embodiments that include a turbocharger, it is also determined at 410 whether the second surface temperature exceeds a second predetermined value. The second predetermined value may be a maximum permitted surface temperature of the turbine housing. The second predetermined value may also relate to thermo-mechanical fatigue requirements of the turbine housing.

At 612, a first control signal is transmitted to the control valve in response to the result of 610 being "YES" (the first surface temperature exceeds the first predetermined value). The first control signal causes the control valve to be actuated to a first position so as to permit coolant fluid to flow through the exhaust cooling circuit. In response to transmitting the first control signal at 612, the method 600 returns to 606 to receive another temperature measurement value.

At 614, a second control signal is transmitted to the control valve in response to the result of 610 being "NO" (the first surface temperature does not exceed the first predetermined value). The first control signal causes the control valve to be actuated to a second position so as to prevent coolant fluid flow through the exhaust cooling circuit. In response to transmitting the first control signal at 614, the method 600 returns to 606 to receive another temperature measurement value.

Reference throughout this specification to "one embodiment" or similar language means that a particular feature, structure, or characteristic described in connection with the embodiment is included in at least one embodiment of the present invention. Thus, appearances of phrases such as "in one embodiment" throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising; an engine defining a water jacket; a heat exchanger in coolant fluid receiving communication with the water jacket, the heat exchanger structured to remove heat from the coolant fluid; an exhaust manifold in exhaust gas receiving communication with the engine, the exhaust manifold defining an exhaust manifold cooling passage; a pump in coolant fluid providing communication with the water jacket, the pump in coolant fluid receiving communication with each of the heat exchanger and the exhaust manifold cooling passage; an engine cooling circuit comprising the water jacket, the heat exchanger, and the pump; an exhaust cooling circuit in coolant fluid receiving communication with the pump, the exhaust cooling circuit comprising the exhaust manifold cooling passage and the pump; and a control valve, comprising: an inlet in coolant fluid receiving communication with the pump, and an outlet in coolant fluid providing communication with the exhaust cooling circuit, the control valve structured to selectively control flow of coolant fluid through the outlet.

2. The system of claim 1, further comprising:
a turbocharger in exhaust gas receiving communication with the exhaust manifold, the turbocharger defining a turbine cooling passage in coolant fluid receiving communication with the outlet of the control valve, and in coolant fluid providing communication with the exhaust manifold cooling passage,
wherein the exhaust cooling circuit further comprises the turbine cooling passage.

3. The system of claim 2, further comprising an exhaust aftertreatment component in exhaust gas receiving communication with the turbocharger, the exhaust aftertreatment system structured to remove a contaminant from the exhaust gas flowing therethrough.

4. The system of claim 2, further comprising:
an expansion tank;
a first drain line in coolant fluid receiving communication with the turbine cooling passage and in coolant fluid providing communication with the expansion tank; and
a second drain line in coolant fluid receiving communication with the exhaust manifold cooling passage and in coolant fluid providing communication with the expansion tank.

5. The system of claim 4, further comprising:
a first check valve positioned in the first drain line so as to prevent backflow of the coolant fluid to the turbine cooling passage; and
a second check valve positioned in the second drain line so as to prevent backflow of the coolant fluid to the exhaust manifold cooling passage.

6. The system of claim 4,
wherein the control valve is controllable between a first position in which the coolant fluid flows through the outlet, a second position, in which the coolant fluid is prevented from flowing through the outlet, and at least one intermediate position, and
wherein, when the control valve is in the second position, an outlet of the exhaust manifold cooling passage operates as a drain so as to transfer the coolant fluid from the exhaust cooling circuit to the engine cooling circuit.

7. The system of claim 2, further comprising:
a first temperature sensor operatively coupled to the exhaust manifold, the first temperature sensor structured to measure a first surface temperature of the exhaust manifold; and
a controller operatively coupled to each of the first temperature sensor and the control valve, the controller comprising;
an operating conditions circuit structured to:
receive, from the first temperature sensor, a first temperature measurement value relating to the first surface temperature, and
determine the first surface temperature by interpreting the received first surface temperature value; and
an exhaust coolant control circuit structured to, in response to the first surface temperature exceeding a first predetermined value, transmit a first control signal to the control valve so as to actuate the control valve to a first position so as to permit coolant fluid to flow through the exhaust cooling circuit.

8. The system of claim 7,
wherein the coolant fluid flows through the engine cooling circuit at a first flow rate, and
wherein the exhaust coolant control circuit is structured to actuate the control valve to a third position so as to cause the coolant fluid to flow through the exhaust cooling circuit at a second flow rate different than the first flow rate.

9. The system of claim 8, wherein the exhaust coolant control circuit is structured to define the second flow rate as a lowest possible value required to prevent the first surface temperature from exceeding the first predetermined value.

10. The system of claim 9, wherein the exhaust coolant control circuit is structured to define the second flow rate as the lowest possible value required to further prevent the coolant fluid from boiling.

11. The system of claim 8, wherein the exhaust coolant control circuit is structured to define the second flow rate so as to minimize an amount of energy transmitted from the exhaust gas to the coolant fluid.

12. The system of claim 7,
wherein the operating conditions circuit is further structured to:
receive, from the first temperature sensor, a second temperature measurement value relating to a second surface temperature of the exhaust manifold, and
determine the second surface temperature by interpreting the received second surface temperature value; and
wherein the exhaust coolant control circuit is further structured to, in response to the second surface temperature falling below a second predetermined value, transmit a fourth control signal to the control valve so as to actuate the control valve to a second position so as to prevent coolant fluid flow through the exhaust cooling circuit.

13. The system of claim 1, further comprising:
a turbocharger in exhaust gas receiving communication with the exhaust manifold, the turbocharger defining a turbine cooling passage in coolant fluid receiving communication with the exhaust manifold cooling passage, and in coolant fluid providing communication with the engine cooling circuit,
wherein the exhaust cooling circuit further comprises the turbine cooling passage.

14. The system of claim 1, wherein the control valve is a first control valve, and further comprising:
a turbocharger defining a turbine cooling passage in coolant fluid providing communication with the pump;
a turbine cooling circuit in coolant fluid receiving communication with the pump, the turbine cooling circuit comprising the turbine cooling passage and the pump; and
a second control valve, comprising:
a second inlet in coolant fluid receiving communication with the pump, and
a second outlet in coolant fluid providing communication with the turbine cooling passage, the second control valve structured to selectively control flow of coolant fluid through the second outlet.

15. A method, comprising:
providing an engine cooling system, comprising a pump structured to circulate a coolant fluid through an engine cooling circuit, the engine cooling circuit comprising a water jacket of an engine, and a heat exchanger;

providing an exhaust cooling system, comprising:
   a control valve, and
   an exhaust cooling circuit selectively fluidly coupled to the pump, the exhaust cooling circuit comprising an exhaust manifold cooling passage defined by an exhaust manifold;
receiving, from a first temperature sensor operatively coupled to the exhaust manifold, a first temperature measurement value relating to a first surface temperature of the exhaust manifold;
determining the first surface temperature by interpreting the first temperature measurement value; and
in response to the first surface temperature exceeding a first predetermined value, transmitting a first control signal to the control valve so as to actuate the control valve to a first position so as to permit coolant fluid to flow through the exhaust cooling circuit.

16. The method of claim 15, wherein the exhaust cooling system further comprises: an expansion tank, a first drain line in coolant fluid receiving communication with the exhaust manifold cooling passage and in coolant fluid providing communication with the expansion tank, and a second drain line in coolant fluid receiving communication with the exhaust manifold cooling passage and in coolant fluid providing communication with the expansion tank.

17. The method of claim 16, further comprising: receiving, from the first temperature sensor, a second temperature measurement value relating to a second surface temperature of the exhaust manifold; determining the second surface temperature by interpreting the second temperature measurement value; and in response to the second surface temperature falling below a second predetermined value, transmitting a second control signal to the control valve so as to actuate the control valve to a second position to prevent coolant fluid flow through the exhaust cooling circuit.

18. The method of claim 15,
   wherein the exhaust cooling circuit further comprises a turbine cooling passage defined by a turbocharger, the turbine cooling passage in coolant fluid receiving communication with the control valve, and in coolant fluid providing communication with the exhaust manifold cooling passage,
   the method further comprising:
      receiving, from a second temperature sensor operatively coupled to the turbocharger, a third temperature measurement value relating to a third surface temperature of the turbocharger;
      determining the third surface temperature by interpreting the third temperature measurement value; and
      in response to the third surface temperature exceeding a third predetermined value, transmitting a third control signal to the control valve so as to actuate the control valve to the first position so as to permit coolant fluid to flow through the exhaust cooling circuit.

19. The method of claim 15,
   wherein the coolant fluid flows through the engine cooling circuit at a first flow rate, and
   wherein the exhaust coolant control circuit is structured to actuate the control valve to a third position so as to cause the coolant fluid to flow through the exhaust cooling circuit at a second flow rate different than the first flow rate.

20. The method of claim 19, wherein the exhaust coolant control circuit is structured to define the second flow rate as a lowest possible value required to prevent the first surface temperature from exceeding the first predetermined value, and to prevent the coolant fluid from boiling.

21. The method of claim 19, wherein the exhaust coolant control circuit is structured to define the second flow rate so as to minimize an amount of energy transmitted from the exhaust gas to the coolant fluid.

22. The method of claim 15, wherein the control valve is a first control, and further comprising:
   providing a turbocharger cooling system, comprising:
      a second control valve, and
      a turbine cooling circuit selectively fluidly coupled to the pump, the turbine cooling circuit comprising a turbine cooling passage defined by a turbocharger;
   receiving, from a second temperature sensor operatively coupled to the turbocharger, a second temperature measurement value relating to a second surface temperature of the turbocharger;
   determining the second surface temperature by interpreting the second temperature measurement value; and
   in response to the second surface temperature exceeding a second predetermined value, transmitting a second control signal to the second control valve so as to actuate the second control valve to the first position so as to permit coolant fluid to flow through the turbine cooling circuit.

* * * * *